United States Patent
Adkar et al.

(10) Patent No.: US 8,358,746 B2
(45) Date of Patent: *Jan. 22, 2013

(54) METHOD AND APPARATUS FOR UNIFIED INTERFACE FOR HETEROGENEOUS SESSION MANAGEMENT

(75) Inventors: Ashutosh Adkar, Pune (IN); Amey Kulkarni, Pune (IN); Anand Paithankar, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 336 days.

This patent is subject to a terminal disclaimer.

(21) Appl. No.: 12/579,775

(22) Filed: Oct. 15, 2009

(65) Prior Publication Data

US 2011/0091022 A1   Apr. 21, 2011

(51) Int. Cl.
*H04M 1/64* (2006.01)
*H04M 3/42* (2006.01)
*G06F 3/00* (2006.01)
*H04L 12/16* (2006.01)

(52) U.S. Cl. ............ 379/87; 379/202.01; 455/416; 715/751; 370/260

(58) Field of Classification Search .... 379/88.11–88.25, 379/221.01, 207.16, 179, 93.25, 87; 455/403, 455/452.1, 445, 564; 370/260, 403; 709/204–205, 709/231, 246, 217, 226; 715/751–753
See application file for complete search history.

(56) References Cited

U.S. PATENT DOCUMENTS

| | | | |
|---|---|---|---|
| 6,611,804 B1 | 8/2003 | Dorbecker et al. | |
| 6,842,503 B1 | 1/2005 | Wildfeuer | |
| 7,079,628 B1 | 7/2006 | Burritt et al. | |
| 7,099,440 B2 | 8/2006 | Michaelis | |
| 7,162,012 B2 | 1/2007 | Freundlich et al. | |
| 7,174,004 B1 | 2/2007 | Michaelis | |
| 7,174,009 B1 * | 2/2007 | Zhang et al. | 379/221.01 |
| 7,376,127 B2 | 5/2008 | Hepworth et al. | |
| 7,379,431 B2 | 5/2008 | Michaelis | |
| 7,386,100 B2 | 6/2008 | Michaelis | |
| 7,487,210 B2 * | 2/2009 | Ludwig et al. | 709/204 |
| 7,561,873 B2 | 7/2009 | Angelopoulos et al. | |
| 7,567,653 B1 | 7/2009 | Michaelis | |
| 7,653,192 B1 * | 1/2010 | Sylvain | 379/202.01 |

(Continued)

FOREIGN PATENT DOCUMENTS

| | | |
|---|---|---|
| CA | 2391428 | 3/1997 |
| WO | WO 98/20409 | 5/1998 |

(Continued)

OTHER PUBLICATIONS

U.S. Appl. No. 12/579,842, filed Oct. 19, 2009, Adkar.

(Continued)

*Primary Examiner* — Mohammad Islam
(74) *Attorney, Agent, or Firm* — Sheridan Ross P.C.

(57) ABSTRACT

Methods, devices and systems for sharing content as part of a voice telephony session are provided. More specifically, content can be added to a voice communication session by selecting, dragging, and dropping a representation of that content onto a representation of the voice communication session. Where the selected content comprises an audio file, that content is played over the voice communication channel. Where the selected content comprises text, the text is converted to speech, and then played over the voice communication channel.

20 Claims, 4 Drawing Sheets

U.S. PATENT DOCUMENTS

| | | | |
|---|---|---|---|
| 2001/0008837 A1* | 7/2001 | Takahashi | 455/403 |
| 2003/0145056 A1* | 7/2003 | Fujisawa et al. | 709/205 |
| 2004/0059841 A1 | 3/2004 | Bateman et al. | |
| 2004/0204116 A1* | 10/2004 | Ben-Efraim et al. | 455/564 |
| 2006/0233326 A1 | 10/2006 | Erhart et al. | |
| 2007/0036370 A1* | 2/2007 | Granovetter et al. | 381/311 |
| 2007/0121657 A1* | 5/2007 | Boillot et al. | 370/403 |
| 2007/0168463 A1* | 7/2007 | Rothschild | 709/217 |
| 2007/0197227 A1* | 8/2007 | Naqvi et al. | 455/445 |
| 2007/0275757 A1* | 11/2007 | Yoo et al. | 455/557 |
| 2007/0286100 A1* | 12/2007 | Saaranen et al. | 370/260 |
| 2007/0294425 A1* | 12/2007 | Sobti et al. | 709/231 |
| 2008/0096603 A1* | 4/2008 | Sparre | 455/550.1 |
| 2008/0190271 A1* | 8/2008 | Taub et al. | 84/645 |
| 2008/0239994 A1* | 10/2008 | Xiong et al. | 370/260 |
| 2008/0274744 A1* | 11/2008 | Naqvi | 455/445 |
| 2009/0074208 A1 | 3/2009 | Roh | |
| 2009/0094531 A1* | 4/2009 | Danieli et al. | 715/753 |
| 2009/0111378 A1* | 4/2009 | Sheynman et al. | 455/41.1 |
| 2009/0327917 A1* | 12/2009 | Aaron et al. | 715/751 |
| 2010/0061276 A1* | 3/2010 | Havens et al. | 370/260 |
| 2010/0080361 A1* | 4/2010 | Houghton | 379/87 |
| 2010/0131978 A1* | 5/2010 | Friedlander et al. | 725/37 |
| 2010/0227597 A1* | 9/2010 | Guccione | 455/416 |
| 2010/0278321 A1* | 11/2010 | Sharp | 379/88.22 |
| 2011/0282978 A1* | 11/2011 | Paithankar | 709/221 |

FOREIGN PATENT DOCUMENTS

| | | |
|---|---|---|
| WO | WO 2004/091168 | 10/2004 |

OTHER PUBLICATIONS

Extended European Search Report for European Patent Application No. 10181559.5, mailed Jan. 12, 2011, 7 pages.

Official Action for U.S. Appl. No. 12/579,842, mailed Jan. 3, 2012 15 pages.

Official Action for U.S. Appl. No. 12/579,842, mailed May 25, 2012, 14 pages.

Notice of Allowance for U.S. Appl. No. 12/579,842, mailed Sep. 11, 2012, 8 pages.

* cited by examiner

METHOD AND APPARATUS FOR UNIFIED INTERFACE FOR HETEROGENEOUS SESSION MANAGEMENT

CROSS REFERENCE TO RELATED APPLICATIONS

This application is related to U.S. patent application Ser. No. 12/579,842, filed Oct. 15, 2009, Entitled "SELECTION AND INITIATION OF IVR SCRIPTS BY CONTACT CENTER AGENTS", the entire disclosure of which is hereby incorporated herein by reference.

FIELD

The present invention is directed to a unified interface for heterogeneous session management. More particularly, methods and apparatuses for adding content to an audio communication session are provided.

BACKGROUND

Communication endpoint users often have access to files that may be in a variety of formats. During a communication session with another communication endpoint, a user of one communication endpoint may wish to share a file or the contents of a file on or associated with that user's communication endpoint, with the user of the other communication endpoint or endpoints. Therefore, it would be desirable to provide a mechanism by which the contents of files could be shared between endpoints between which a voice communication channel has been established.

As a particular example, communication application users, such as call center agents, are commonly employed to provide customer service and support. In a typical scenario, a communication application user is assigned to handle a call by an automatic call distribution system. Once the user is placed in voice communication with the customer, voice communications over the operative communication network or networks can begin. If either party to the call wishes to share content such as a text document, email message, or audio file, present solutions do not provide an integrated method for doing so.

Audio communication and conferencing solutions that support multimodal communications have been developed. In general, such solutions require specialized software be present at all endpoints. In addition, in order to share a file in support of voice communications between users at the different endpoints, existing multimodal audio conferencing solutions generally require that the file first be opened using an appropriate application by the party wishing to share the content of the file. The application must then be associated with the conferencing program. Accordingly, use of such systems is relatively complex and non-intuitive.

SUMMARY

Systems and methods for sharing content in support of voice communication sessions are provided. More particularly, a facility that allows for the association of content in the form of a computer readable file or set of data to be shared with a communicant as part of a voice telephony communication is provided. In accordance with embodiments of the present invention, this facility allows a user at one endpoint of the communication to associate content with that communication by selecting that content, and indicating that the content should be provided as part of the audio communication session.

In accordance with embodiments of the present invention, associating a computer file or set of data with the audio communication session includes a user of a content sharing endpoint receiving input from a user of an endpoint of the communication session selecting a computer file. Associating that file with the audio communication session further includes receiving input from the user that includes moving a representation of that file to a representation of the audio communication session. For example, the content may be included in a list of available computer files, while the audio communication session may be represented by information regarding that session graphically displayed to the user. The user selects one of the computer files from the listing, and drags that file to the representation of the audio communication session. The user then drops the file into the representation of the audio communication session.

In order to share the content of the selected computer file with users at other endpoints of the audio communication session, the content of the selected computer file can be played as an audio output over the communication channel that is supporting the audio communication session, for example where the selected computer file comprises audible information. Where the selected computer file does not comprise audible information, a transformation of the content of the computer file may be performed. For example, a computer file containing text may be transformed using a text to speech application and then played as an audio output over the communication channel.

Additional features and advantages of embodiments of the present invention will become more readily apparent from the following description, particularly when taken together with the accompanying drawings.

DETAILED DESCRIPTION

Figure 1:
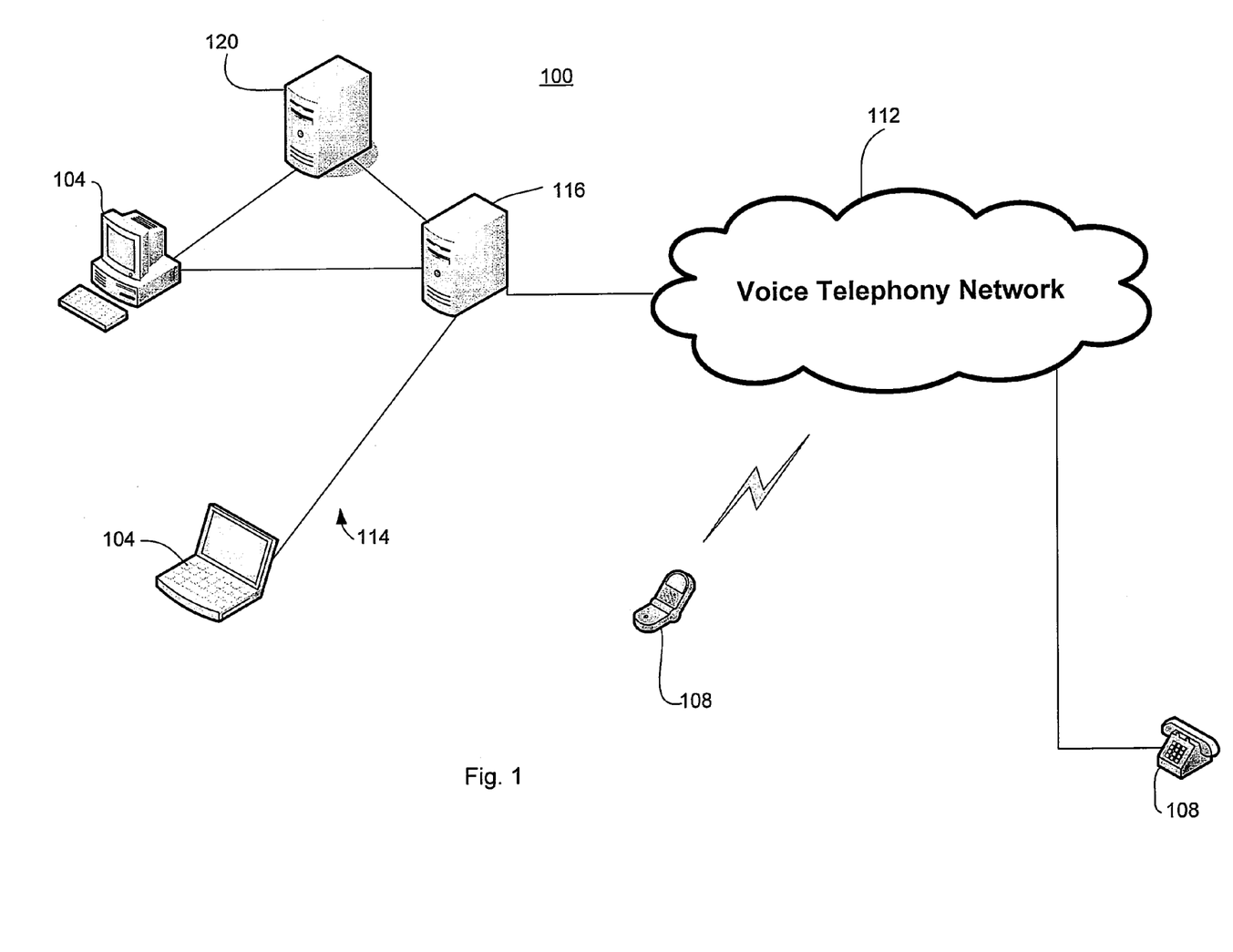
FIG. 1 is a diagram depicting components of a system in accordance with embodiments of the present invention.

FIG. 1 is a block diagram depicting components of a system 100 in accordance with embodiments of the present invention. In general, the system 100 includes one or more content sharing endpoints 104 and one or more client endpoints 108. In general, a content sharing endpoint 104 is placed in communication with a client endpoint 108 via a voice communication or voice telephony network 112. In accordance with at least some embodiments of the present invention, the content sharing endpoint 104 may be part of an enterprise network 114. Accordingly, a call server or an enterprise call server 116 may interconnect the content sharing endpoints 104 to the voice telephony network 112. A content server 120 may also be included. The content sharing endpoints 104, call server 116, and/or content server 120 may be interconnected to one another through direct, point to point connections, or through a network, such as a local area network.

The content sharing endpoints 104 generally comprise communication endpoints capable of supporting audio communications over a voice telephony network 112. In addition, the content sharing endpoints 104 can present information to a user and receive input from the user, in connection with a graphical user interface. Moreover, the user can select content for sharing with other endpoints 104, 108 through the graphical user interface. Accordingly, an example of a content sharing endpoint 104 is a general purpose computer running a communication application, such as a soft phone application, in addition to a content sharing application as described herein.

The client endpoint 108 is also an endpoint that is capable of supporting audio communications over a voice telephony network 112. However, the client endpoint 108 is not required to support a graphical user interface, or the output of content in a format other than in an audible format. Examples of a client endpoint 108 include a conventional public switched telephone network telephone, a cellular or other mobile telephone, or a soft phone running as part of a general purpose computer.

As noted above, the content sharing endpoint or endpoints 104 may be provided as part of an enterprise network 114. The call server 116 may comprise a communication server capable of running program instructions, including applications or other programming for distributing calls. In accordance with further embodiments, a content sharing endpoint 104 can be directly connected to the voice telephony network 112.

Alternatively, a content server 120 may be provided that is operatively interconnected to a content sharing endpoint 104. The content server 120 may operate as a repository of files that can be accessed by users of one or more content sharing endpoints 104, and may be connected to a content sharing endpoint 104 directly or through a network 114. For example, the content server 120, if provided, may store audio or text files that can be selected for sharing with the endpoints 104, 108 participating in an audio communication.

As can be appreciated by one of skill in the art, the enterprise network 114 may incorporate a local area network. Examples of an enterprise network 114 therefore include an Ethernet Network, which may further comprise a virtual private network or an intranet.

The voice telephony network 112 could be any type of network capable of supporting voice communications between one or more content sharing endpoints 104 and one or more client endpoints 108. For example, the voice telephony network 112 may comprise a communication network, such as the public switched telephone network, a cellular telephony network, a satellite telephony network, the Internet, a private intranet, a local area network, and the like. In addition, the voice telephony network 112 may comprise a plurality of networks and/or a plurality of networks of different types. In addition, it should be appreciated that the voice telephony network 112 is not limited to a network or networks that are incapable of carrying data other than voice data.

Figure 2:
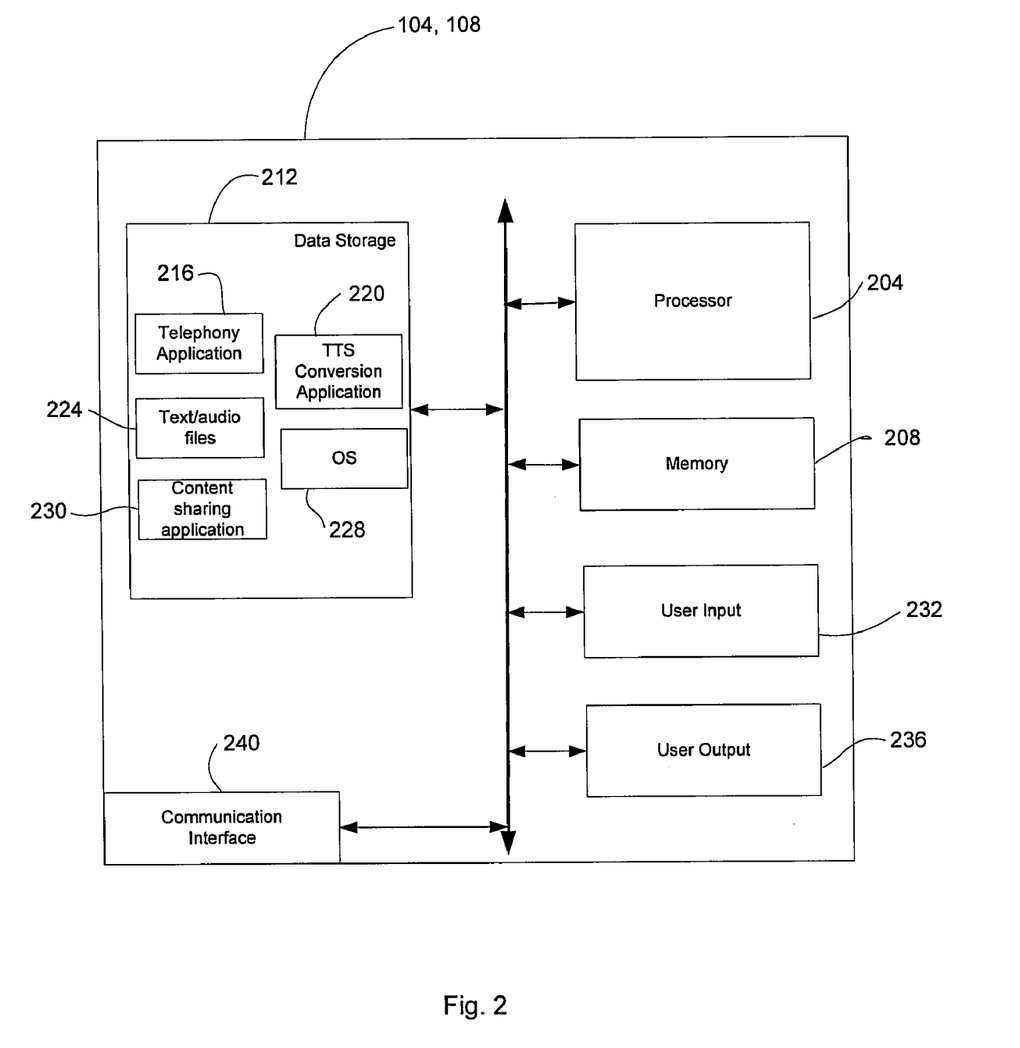
FIG. 2 is a block diagram of a communication endpoint in accordance with embodiments of the present invention.

FIG. 2 illustrates components of a content sharing endpoint 104 and/or a client endpoint 108 in accordance with embodiments of the present invention. The components may include a processor 204 capable of executing program instructions or software. Accordingly, the processor 204 may include any general purpose programmable processor or controller for executing application programming or instructions. As a further example, the processor 204 may comprise a specially configured application specific integrated circuit (ASIC). The processor 204 generally functions to run programming code or instructions implementing various of the functions performed by the endpoint 104, 108. As will be described in greater detail herein, such functions may include, in the case of a content sharing endpoint, the association of content with a voice communication session.

An endpoint 104, 108 may additionally include memory 208 for use in connection with the execution of programming by the processor 204, and for the temporary or long term storage of program instructions and/or data. As examples, the memory 208 may comprise RAM, SDRAM, or other solid state memory. Alternatively or in addition, data storage 212 may be provided. In accordance with embodiments of the present invention, data storage 212 can contain program instructions or code implementing various of the applications executed by the endpoint 104, 108, and data that is used and/or generated in connection with the execution of applications. Like the memory 208, the data storage 212 may comprise a solid state memory device. Alternatively or in addition, the data storage 212 may comprise a hard disk drive or other random access memory. In accordance with still other embodiments, the memory 208 may provide random access storage, while some or all of the data storage 212 may comprise read only storage.

Examples of application programming or instructions that can be stored in data storage 212 includes a telephony application 216, and a text to speech conversion application or engine 220. The data storage 212 may also function to store computer files or content 224, such as text or audio files, comprising content that can be shared by a content sharing endpoint 104. The content 224 may be of various types. For example, content 224 may comprise audio files. As a further example, the content 224 may comprise files containing text that can be played over an audio communication otherwise comprising a voice telephony session after processing by the text to speech conversion application 220. As yet another example, the content 224 may comprise non-voice media, such as is used in connection with telephone typewriter (TTY) systems used by people who are deaf or hard of hearing, or other media that is or can be used in connection with session initiation (SIP) telephony. Alternatively or in addition, content 224 available for sharing may be stored in a content server 120. The data storage 212 may additionally provide storage for operating system software 228. In addition to providing an operating environment for applications running on the endpoint 104, 108, the operating system software 228 may provide and control the functions of a user interface presented by the endpoint 104, 108 to the user of that endpoint 104, 108. For example, the operating system software 228 may provide a graphical user interface.

Another application that can be stored in data storage 212 is a content sharing application 230. The content sharing application 230, in accordance with embodiments of the present invention, provides functionality that allows a user of a content sharing endpoint 104 to add content 224 comprising, stored in or associated with a computer file, to a voice or audio communication established over the voice telephony network 112, for example between the content sharing endpoint 104 and a client endpoint 108. Moreover, as described in greater detail elsewhere herein, the content sharing application 230 enables a representation of content 224, for example in the form of an identification of a computer file comprising content, to be associated with an in-progress voice communication, by dragging and dropping that representation of the content 224 into a representation of the voice communication presented by the telephony application 216, in cooperation with the graphical user interface generated by operation of the operating system software 228. An endpoint 104, 108 also generally includes one or more user input devices 232. Examples of user input devices 232 include a keyboard, a pointing device combined with a display screen or other position encoder, a microphone or other audible input device, a keypad, and a touch screen display. In addition, one or more user output devices 236 may be provided. Examples of user output devices 236 include a display and audio output device. An endpoint 104, 108 also generally includes one or more communication network interfaces 240. Examples of communication network interfaces 240 that may be included in an endpoint 104, 108 include a packet data network interface, such as a wired or wireless Ethernet interface or cellular packet data interface, a telephony network interface, or other wireless or wireline interfaces.

As can be appreciated by one of skill in the art after consideration of the present disclosure, the included components of a content sharing endpoint 104 may differ from those of a client endpoint 108. For example, a client endpoint 108 typically will not include a text to speech conversion application 220, text or audio files 224 comprising content available for sharing, a content sharing application 230, although such applications and files may be present on a client endpoint 108. In addition, it should be appreciated that other endpoint 104, 108 configurations are possible. For example, a client endpoint 108 may comprise a common, analog public switched telephony network (PSTN) telephone.

Figure 3:
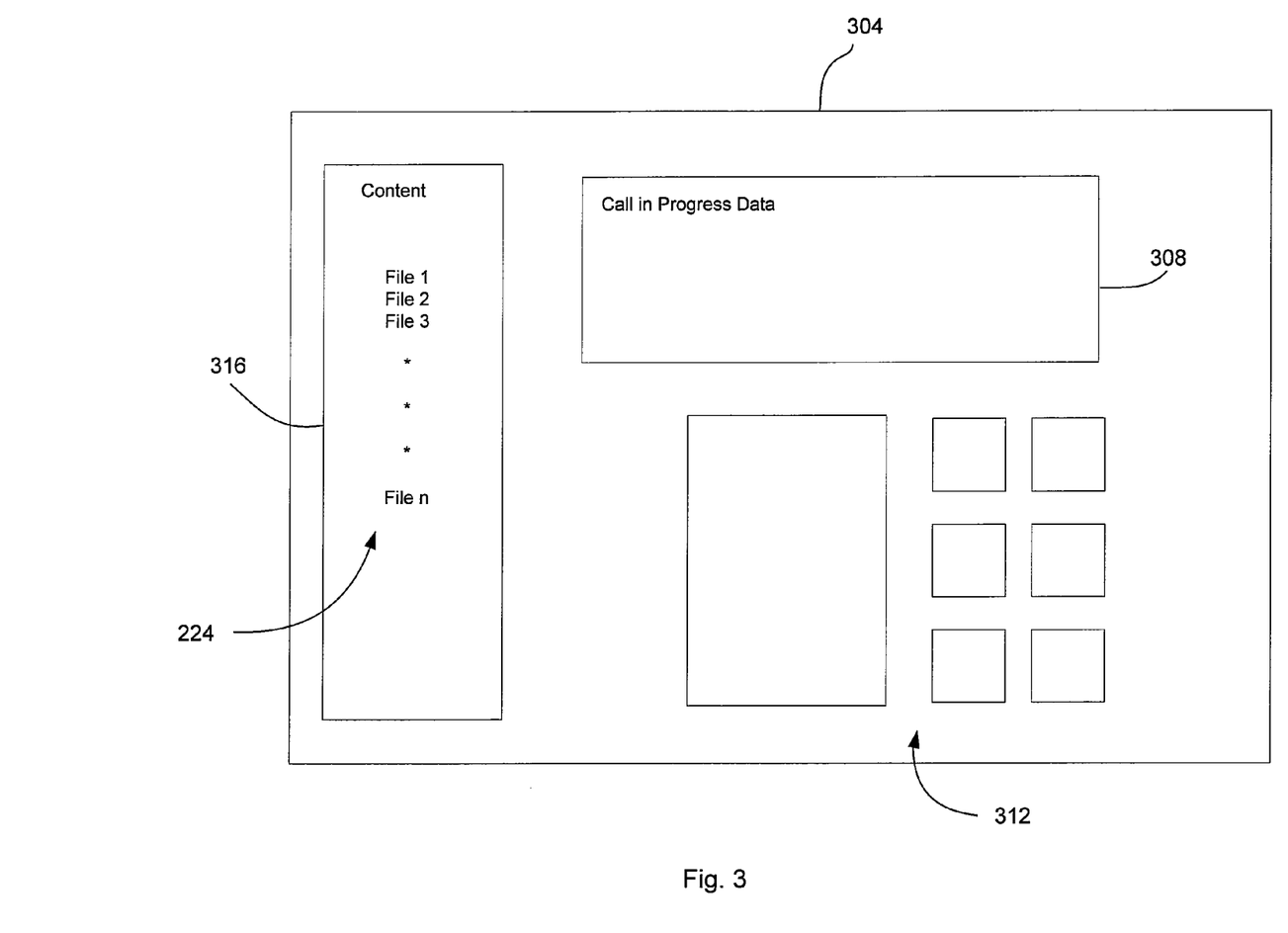
FIG. 3 depicts a graphical user interface displayed to a user of a content sharing endpoint in accordance with embodiments of the present invention.

FIG. 3 depicts a graphical user interface 304 displayed to a user of a content sharing endpoint 104 in accordance with embodiments of the present invention. According to this exemplary graphical user interface display 304, an area containing call in progress data 308 is displayed to the user of the content sharing endpoint 104. The call in progress data 308 can include any data associated with a voice telephony communication. Accordingly, the graphical user interface 304 can be understood to operate in cooperation with a soft phone application or telephony application 216. Examples of the call in progress data include the time the call has been active, and information identifying the client 108 or other endpoint or endpoints in communication with the content sharing endpoint 104 displaying the graphical user interface 304 to a user of that endpoint 104.

The graphical user interface 104 may additionally present control buttons 312. These control buttons 312 generally allow the user of the content sharing endpoint 104 to control aspects of the operation of the endpoint 104. Accordingly, control buttons 312 may be provided for performing such functions as dropping the call, conferencing in another party, placing an active call on hold and activating a mute function. The control buttons 312 may also present a virtual keyboard or virtual numeric keypad, and controls associated with playing selected content 224.

In addition, a graphical user interface 304 in accordance with embodiments of the present invention presents a representation 316 of one or more files comprising content 224 that can be selected by the user of the content sharing endpoint 104 and shared with a client endpoint 108. The representation 316 of the available content 224 may take various forms. For example, the representation 316 may comprise a list of files or content 224 that a user of the content sharing endpoint 104 presenting the graphical user interface 304 can select using an input 232 comprising a pointing device. As another example, an item of content 224 can be selected from a drop down list included as part of a hierarchical or categorized menu presented by the graphical user interface 304. As yet another example, a specific item of content 224 can be located by entering search terms, for example via control buttons 312 presented by the user interface 304 or other user input 232 provided by the content sharing endpoint 104, and the item or items of content 224 responsive to the query can be presented as the representation of files 316. The list or menu of available content 224 may be generated by the content sharing application 230 and may comprise a selection of content 224 that the content sharing application 230 is capable of sharing over a voice communication channel. Alternatively, the list of content 224 may simply be a list of files generally available to the content sharing endpoint 104 that has not been filtered for compatibility with the content sharing application 230.

In general, while a call is in progress, as represented by the call in progress data 308, the user of the content sharing application 230 can select an item of content 224 from the representation 316, and drag that representation to the depiction of the active call in the call in progress data 308 portion of the graphical user interface 304. By dropping the selected item of content 224 into the active call in the call in progress data 308 area, the content comprising the file 224 is shared. More particularly, the content sharing application 230 may play audio output generated or derived from the selected item of content 224 over the voice channel established between the endpoints 104, 108. Accordingly, the graphical user interface 304 can be understood to operate in cooperation with the content sharing application 230.

Figure 4:
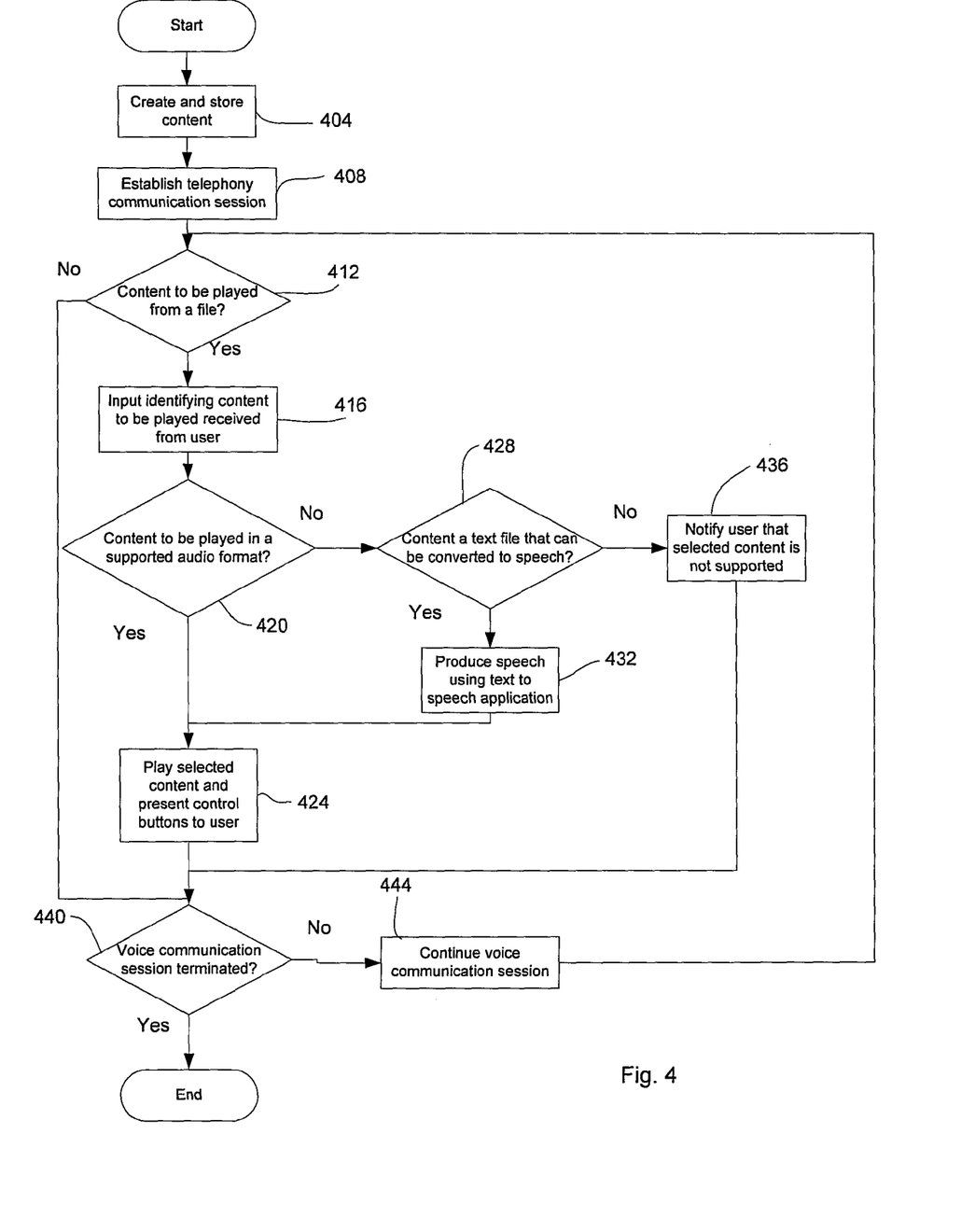
FIG. 4 is a flowchart depicting aspects of the operation of a system in accordance with embodiments of the present invention.

With reference now to FIG. 4, aspects of the operation of a communication system 100 comprising a content sharing application 230 in accordance with embodiments of the present invention are illustrated. Initially, content 224 is created (step 404). This content 224 may be in various forms. For example, the content 224 may comprise audio files, such as music, podcasts, and the audio portion of multimedia files or content. Moreover, examples of the types of files that may comprise such content 224 include, without limitation, .mp3, .wav, and .dss files. In accordance with further embodiments of the present invention, the content 224 need not comprise audio information, at least in a native format. For example, the content 224 may comprise content capable of transformation to an audible format. Accordingly, content 224 may comprise text files or files containing text, and the portion of that content 224 that is shared as part of a telephony communication, for example between the content sharing endpoint 104 and a client endpoint 108, can comprise speech generated by a text to speech engine 220, that is provided with the text included in the selected content 224 for transformation to speech. As a further example, the content 224 can comprise text that is output as text at the receiving endpoint 104 or 108. Moreover, the output of text generated from content 224 can occur simultaneously with voice communications over the communication channel. The content 224 can be stored in data storage 212 provided as part of the content sharing endpoint 104. Alternatively or in addition, content 224 may be stored in another device, such as a content sharing server 120.

At step 408, a telephony communication session is established between the content sharing endpoint 104 and a client endpoint 108. Either endpoint may initiate the communication session. In addition, more than two endpoints may participate in the communication session. At step 412, a determination is made by the user of the content sharing endpoint 104 as to whether content comprising a computer file 224 should be played from a stored file over the audio call or audio bridge comprising the telephony communication. If it is determined that content 224 should be shared, input from the user of the content sharing endpoint 104 selecting the item of content 224 to be shared is received (step 416). More particularly, in accordance with embodiments of the present invention, such input comprises a selection of an item of content 224 from a representation of such content 316, and dragging and dropping that representation into a call status bar presented as part of call in progress data 308, all of which are displayed to the user of the content sharing endpoint 104 by the graphical user interface 304. Accordingly, the user can graphically associate a selected item of content 224 with an in progress call or voice communication. At step 420, the content sharing application 230 determines whether the selected content 224 is in a supported audio format. If the selected content 224 is in a supported audio format, the content sharing application 230 plays or streams the audio content into the voice communication (step 424). After or when playback of an audio or text file is initiated, the graphical user interface 104 may present control buttons 312 that allow the user to manage playback of the session. Examples of such controls can include controls that allow the user to pause, play or stop the stream being shared as part of the voice communication.

If the selected content does not comprise a supported audio file, a determination is made as to whether the selected content 224 is a file containing text (step 428). If the file is determined to contain text, it is provided to the text to speech engine 220 for conversion (step 432), and the resulting speech is added to the voice communication session. Alternatively, if the text is for output as text as part of, for example, a TTY system, it can be streamed in SIP. If the selected content 224 does not comprise a text file and/or is otherwise not in a supported format, the user of the content sharing endpoint 104 may be notified (step 436), so that different content 224 can be selected, or a plug-in or other facility necessary to share that content 224 can be obtained.

At step 440, a determination may be made as to whether the voice communication session has been terminated. If the voice communication session has been terminated, the process may end. If the voice communication session has not been terminated, the voice communication session continues (step 444).

As can be appreciated by one of skill in the art after consideration of the present disclosure, aspects of the invention have application in various scenarios. For example, in a customer service contact center scenario, a user of a content sharing endpoint 104 comprising a contact center agent may make use of the content sharing application 230 to select and play audio files that provide information needed by a customer comprising a user of a client endpoint 108. As a further example, the content sharing application 230 may be used to share the content of text files over a voice communication channel. For instance, a business user engaged in a telephone conference with an associate may make use of the content sharing application 230 to share the content of an email. Accordingly, embodiments of the present invention have application in any situation in which the user of a content sharing endpoint 104 wishes to share content in an audible form with a user of another endpoint (e.g., a client endpoint 108).

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for sharing content over a voice telephony network, comprising:

establishing a first audio communication session using the voice telephony network, wherein the first audio communication session places a first communication endpoint at a first location in audio communication with at least a second communication endpoint at a second location, wherein the first audio communication session is the only active communication channel between the first and second communication endpoints, and wherein the second communication endpoint is not required to support the output of content in a format other than an audible format;

displaying a graphical representation of the first audio communication session established using the voice telephony network at the first communication endpoint;

determining a need to share content, wherein the content is available as a computer file;

associating, in response to input from a user of the first communication endpoint, the computer file with the first audio communication session, wherein the input from the user includes using an input device to drag a representation of the computer file to a graphical representation of the established first audio communication session;

producing an audible output from the computer file;

playing the audible output from the computer file into the first audio communication session established using the voice telephony network, wherein the audible output from the computer file is provided to at least the second communication endpoint as part of the first audio communication session established using the voice telephony network.

2. The method of claim 1, wherein associating the computer file with the audio session is performed by a communicant at the first location.

3. The method of claim 2, wherein associating the computer file with the audio session includes the communicant dragging a graphical representation of the computer file to the graphical representation of the audio communication session.

4. The method of claim 2, wherein the audible output is received by a communicant at the second location.

5. The method of claim 1, further comprising:
determining the format of the computer file.

6. The method of claim 5, further comprising:
in response to determining that the computer file includes a text file, processing content included in the computer file to convert the content to an audible output using a text to speech facility.

7. The method of claim 5, further comprising:
in response to determining that the computer file does not include an audio file, converting content included in the computer file to an audible output.

8. The method of claim 1, wherein a first communicant at the first location and a second communicant at the second location are in audio communication with one another only during the established audio communication session.

9. The method of claim 1, wherein the first audio communication session between the first communication endpoint and the second communication endpoint supports only audible communications.

10. The method of claim 1, wherein the second communication endpoint is a conventional public switched telephony network telephone, and wherein the second communication device does not support the output of content in a format other than an audible format.

11. A system for supporting voice communications, comprising:
a first communication endpoint, including:

a voice input device operable to receive speech from a first user;

a display operable to display visual information to the first user;

a graphical user interface displayed to the first user by the display, wherein the graphical user interface displays, to the first user, an audio session status for a first in-progress audio session and a representation of at least a first computer file;

a communication interface, wherein, in response to input from the first user selecting the first computer file and graphically associating the first computer file with the first in-progress audio session, an audio output from the first computer file is output from the communication interface and is delivered to a second communication endpoint as part of the first in-progress audio session, wherein the second communication endpoint is not required to support output of content in a format other than an audible format, and wherein the first in-progress audio session is the only active communication link between the first and second communication endpoints.

12. The system of claim 11, wherein the first communication endpoint further includes:

a pointing device, wherein graphically associating the first computer file with the first in-progress audio session includes dragging a representation of the first computer file presented by the graphical user interface to the audio session status presented by the graphical user interface.

13. The system of claim 11, wherein the first communication endpoint further includes:

a processor;

software running on the processor, wherein the audio output from the first computer file is produced by the software.

14. The system of claim 13, wherein the first computer file is a text file, and wherein the software includes a text to speech application.

15. The system of claim 11, further comprising:

data storage, wherein the first computer file is stored on the data storage.

16. A communication system, comprising:

a first communication endpoint, including:
 a display;
 an audible information input device;
 an audible information output device;
 a pointing device;
 a processor;
 data storage;
 a plurality of data files stored in the data storage, wherein a representation of at least some of the data files is presented to a user of the first communication endpoint by the display;

a communication network;

a telephony application, wherein a representation of an in-progress voice communication including the first communication endpoint is presented to the user of the first communication endpoint by the display;

a content sharing application, wherein the content sharing application is operable to play content from a selected data file into the in-progress voice communication;

a second communication endpoint, including:
 an audible information input device;
 an audible information output device;
 wherein the second communication endpoint is not required to support output of content in a format other than an audible format, wherein the first and second communication endpoints are in communication with one another only through the in-progress voice communication, and wherein the in-progress voice communication is established over the communication network, wherein the in progress voice communication established over the communication network only passes audible information between the first and second communication endpoints, wherein the audible information passed between the first and second communication endpoints as part of the in-progress voice communication includes voice data from a user of the first communication endpoint, voice data from a user of the second communication endpoint, and audible data produced from at least a first data file included in the plurality of data files stored in data storage on the first communication endpoint, and wherein the first data file is selected by the user of the first communication endpoint operating the pointing device to drag and drop a representation of the first data file onto the representation of the voice communication.

17. The system of claim 16, wherein the first communication endpoint is interconnected to the communication network through a communication server.

18. The system of claim 16, wherein the first data file contains audio data, and wherein at least some of the audio data is transmitted by the communication network from the first communication endpoint to the second communication endpoint.

19. The system of claim 16, wherein the first communication endpoint further includes a text to speech application, wherein the text to speech converts text included in the first data file to speech, and wherein the speech is transmitted by the communication network from the first communication endpoint to the second communication endpoint.

20. The system of claim 16, wherein the first communication endpoint includes a soft phone application, and wherein the communication network includes a voice telephony network.

* * * * *